(12) United States Patent
Warzelhan et al.

(10) Patent No.: US 9,996,751 B2
(45) Date of Patent: Jun. 12, 2018

(54) METHOD FOR MONITORING A MONITORED REGION RECORDED BY A CAMERA

(71) Applicant: Robert Bosch GmbH, Stuttgart (DE)

(72) Inventors: Jan Karl Warzelhan, Bad Salzdetfurth Ot Heinde (DE); Nicolas Cebron, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 12 days.

(21) Appl. No.: 15/039,484

(22) PCT Filed: Sep. 25, 2014

(86) PCT No.: PCT/EP2014/070540
§ 371 (c)(1),
(2) Date: May 26, 2016

(87) PCT Pub. No.: WO2015/078612
PCT Pub. Date: Jun. 4, 2015

(65) Prior Publication Data
US 2017/0177945 A1    Jun. 22, 2017

(30) Foreign Application Priority Data
Nov. 28, 2013    (DE) .................. 10 2013 224 376

(51) Int. Cl.
*G06K 9/00* (2006.01)
*G06K 9/32* (2006.01)
*G08B 13/196* (2006.01)

(52) U.S. Cl.
CPC ....... *G06K 9/00771* (2013.01); *G06K 9/3233* (2013.01); *G08B 13/19613* (2013.01); *G08B 13/19652* (2013.01)

(58) Field of Classification Search
None
See application file for complete search history.

(56) References Cited

U.S. PATENT DOCUMENTS 8,121,618 B2 *    2/2012    Rhoads .................. G01C 21/20
                                                       455/456.1
2009/0060276 A1    3/2009    Yu et al.
(Continued)

FOREIGN PATENT DOCUMENTS

| DE | 102007041893 | 3/2009 |
|----|--------------|--------|
| EP | 2410115 | 1/2012 |
| WO | 2012010109 | 1/2012 |

OTHER PUBLICATIONS

Kemmann H et al., WO 2012010109 A1. Translation of System for processing visual, auditory, olfactory or haptic information for cognitive determination of condition, Obtained Online via Google Patents, Date Accessed Jul. 9, 2017. Available online: https://patents.google.com/patent/WO2012010109A1/en.*

(Continued)

*Primary Examiner* — Tahmina Ansari
(74) *Attorney, Agent, or Firm* — Michael Best & Friedrich LLP

(57) ABSTRACT

The invention relates to a method for monitoring a monitored region (10) recorded by a camera, wherein a content analysis is performed for a sub-region (20) of the monitored region (10); wherein the sub-region (20) is determined in dependence on one or more parameters; and wherein the determination of the sub-region (20) is performed anew when at least one of the parameters changes during the monitoring.

14 Claims, 3 Drawing Sheets

(56) References Cited

U.S. PATENT DOCUMENTS

| | | | | |
|---|---|---|---|---|
| 2010/0002929 A1* | 1/2010 | Sammak | ............ | G06K 9/00127 |
| | | | | 382/133 |
| 2011/0025825 A1* | 2/2011 | McNamer | .......... | H04N 13/0221 |
| | | | | 348/46 |
| 2016/0021307 A1* | 1/2016 | Warzelhan | ............. | H04N 5/232 |
| | | | | 348/143 |
| 2016/0110603 A1* | 4/2016 | Govil | ..................... | G06K 9/605 |
| | | | | 382/103 |
| 2017/0177945 A1* | 6/2017 | Warzelhan | ........... | G06K 9/3233 |

OTHER PUBLICATIONS

International Search Report for Application No. PCT/EP2014/070540 dated Jan. 16, 2015 (English Translation, 2 pages).

* cited by examiner

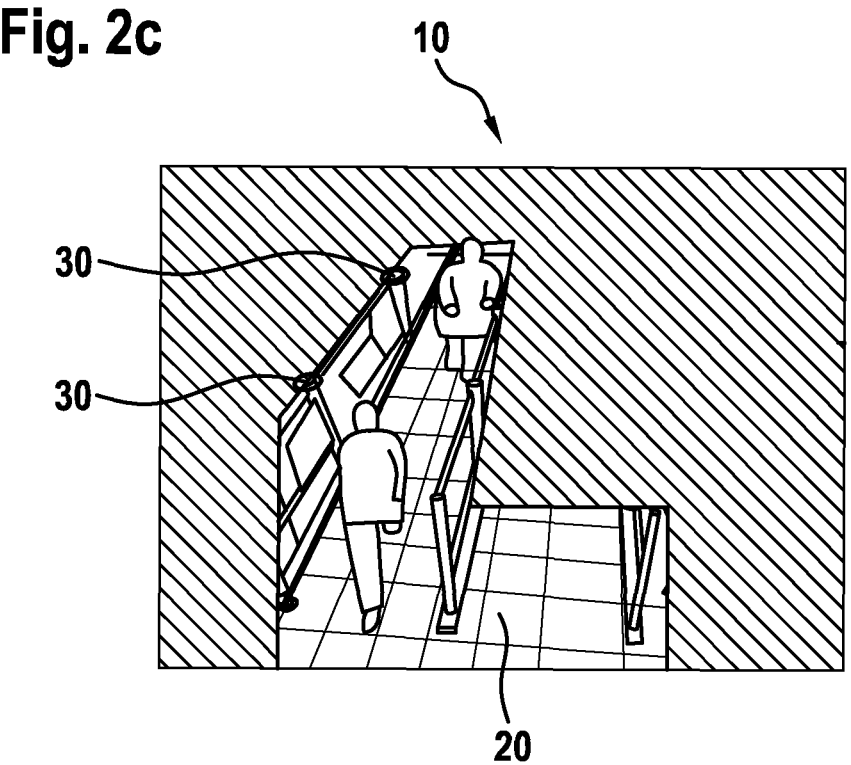

METHOD FOR MONITORING A MONITORED REGION RECORDED BY A CAMERA

BACKGROUND OF THE INVENTION

The present invention relates to a method for monitoring a monitored region recorded by a camera, in particular a smart camera.

"Smart cameras" refer to optical systems which not only capture images but are also able to autonomously process and/or interpret said images. In addition to providing an image capturing circuit, a smart camera can, for example, as an intelligent and autonomous optical system, filter out and process application-specific items of information from captured images and make decisions as a result of this.

Prior knowledge about a scene geometry of a region to be monitored can be used for a video content analysis in order to improve performance with regard to object detection, object tracking and classification or to check the plausibility of objects.

Certain sub-regions of the monitored region recorded by the camera can then be masked as being irrelevant, i.e excluded for the automatic image processing.

A method for video monitoring is known, for example, from the German patent specification DE 10 2007 041 893 A1, in which different regions in which disturbing objects appear or can appear are only analyzed or, respectively, monitored to a limited extent.

Monitoring cameras have, however, in recent times been used for more complex scenes, such as, e.g., super markets in which the required performance for the image processing increases. A simple masking of regions not be monitored is moreover often not possible.

It is therefore desirable to specify an option for determining regions of a monitored region in such a way, that the required video content analysis is kept to a minimum, especially contingent on particular situations.

SUMMARY OF THE INVENTION

In a method according to the invention for monitoring a monitored region recorded by a camera, in particular a smart camera, in which a content analysis is performed only for a sub-region of the monitored region, it is advantageous if the sub-region is determined on the basis of parameters and if the sub-region is, in particular automatically, adapted for the content analysis when a change in at least one of the parameters occurs during the monitoring. Regions of the monitored region outside of the sub-region are therefore masked out, and a content analysis is not performed in said regions. As a result, a processing power required for the monitoring is reduced to the bare necessities and yet all necessary or important scenes can be monitored. By means of the invention, the portion of the monitored region to be analyzed (i.e. the sub-region) can be kept small, which facilitates the execution of algorithms in real time. By masking out interfering regions or irrelevant regions, no alarm/meta data are generated there, which in turn can enhance the awareness of the observer.

The sub-region is preferably selected on the basis of a planar surface in the monitored region, such as, e.g., a floor on which people move. This planar surface can, for example, be selected in the camera image by a user; whereupon, in a simple design, the selected surface forms the sub-region. The sub-region is, however, preferably determined while taking into consideration the height of objects which are located on the surface. In so doing, the sub-region can be isolated as well as possible to required regions on which people can move. It is very easy to mark the sub-region by means of a layout description. During a configuration process, regions in which moving objects can appear cannot, however, be seen in the image at every position. It is therefore difficult to define these regions. The camera or, respectively, the monitoring system is particularly advantageously equipped to autonomously determine the sub-region by means of a calibration (in particular of the height). This is advantageous when using object detectors. Using the camera image, the user can mark the floor region on which people may be present. By means of a camera matrix and/or projection matrix, the associated 3D point in a world coordinate system can be calculated for all of the image points in the 2D image which map the floor which has been marked off. Starting from the 3D point on the datum plane, a fictitious height (height region) of the person can be assumed, e.g. between 1.2 and 2 meters. This 3D point having a certain height (or heights) can be transformed back into the 2D image plane by means of the projection matrix. Thus, a position in the 2D image which reproduces a head position of a possible person is obtained. It can therefore be estimated in which image regions people can, e.g., be located. If all of the options are calculated, a mask image can be created. This is, however, not necessarily only a 2D masking but rather describes a 3D volume. When detecting an object, a certain mask size is run over the image, in order to reach a decision at all possible points whether the object to be detected is located there or not. This theoretically has to be done for each pixel position and possible mask size (e.g. for people who are 1.2 m to 2 m in height), which leads to a multiplicity of tests. To this end, a limitation of the search region to one sub-region is very advantageous.

The parameters advantageously comprise output values of one or a plurality of sensors, e.g., for a door, a sliding door, a gate or a light barrier, or a motion detector. As a result, the system can recognize which regions have to be monitored or, respectively, analyzed, i.e. where people are now possibly located.

It is furthermore advantageous if the parameters also comprise image processing parameters for the content analysis. In this way, the background of the monitoring can, e.g., be excluded or directions of movement can be detected.

The sub-region is thereby not limited to a continuous region. Moreover, two or a plurality of regions separated from one another can be used for the content analysis. This is, e.g., useful if a wall or something similar is situated in the middle of the monitored region so that people may not enter into this region.

A calculation unit according to the invention, which, e.g., is integrated into the camera, in particular a smart camera, or is a constituent part of a higher-level system, is equipped, particularly in terms of programming technology, to carry out a method according to the invention.

The implementation of the method in the form of software is also advantageous because this entails particularly low costs, in particular if an executing control device can still be used for other tasks and is therefore on hand in any case. Suitable data carriers for providing the computer program are particularly disks, hard drives, flash memory, EEPROMs, CD-ROMs, DVDs et al. A download of a program via computer networks (Internet, Intranet, etc.) is also possible.

Further advantages and embodiments of the invention ensue from the description and the attached drawings.

It goes without saying that the features which were previously mentioned and which are still to be explained below cannot only be used in the combination specified in each case but also in other combinations or in isolation without departing from the scope of the present invention.

The invention is schematically depicted in the drawings on the basis of the exemplary embodiments and is described below in detail with reference to said drawings.

DETAILED DESCRIPTION

Figure 1A:
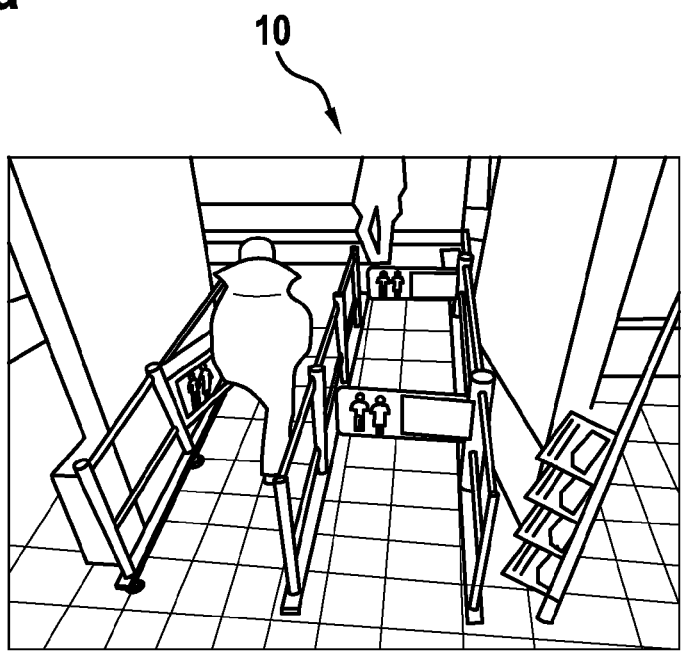
FIG. 1 shows a monitored scene and a region selected thereon for the content analysis for a method which is not according to the invention.

A monitored scene comprising a monitored region 10, by way of example an entry area to a super market, is depicted in FIG. 1. The complete monitored region 10 is shown in FIG. 1a.

Figure 1B:
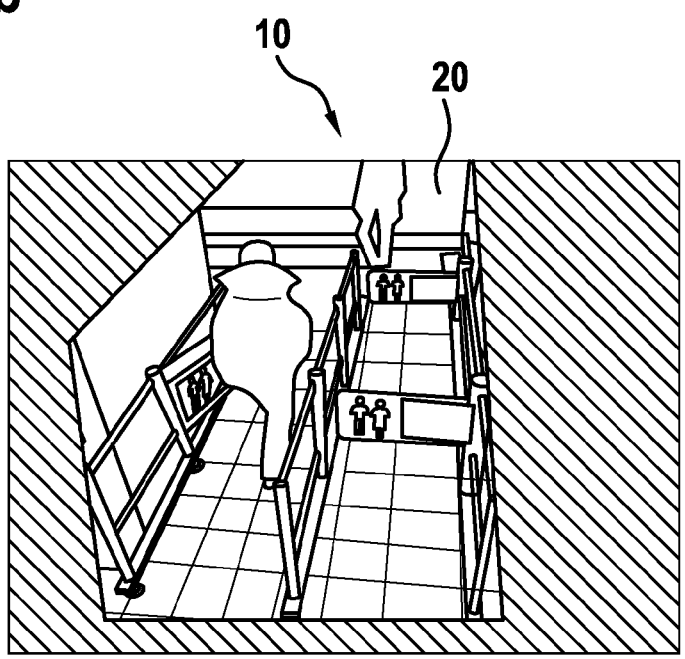

In FIG. 1b, a sub-region 20 of the monitored region 10 is selected, which is used for the content analysis during the image processing in a camera. The hatched region is excluded from the content analysis in this case because no people are allowed to gather there or, respectively, said region is not relevant, as a comparison with FIG. 1a shows.

The entry area is only of interest particularly, e.g., when counting people who enter and/or leave the super market. The disadvantage here is, however, that the entire entry area is permanently used for the content analysis irrespective of whether or not people are actually currently present in the entry area.

The same monitored region 10 as in FIG. 1 is shown in FIG. 2. The selected sub-regions 20, which are used for the content analysis, are different from one another, as explained below.

Figure 2A:
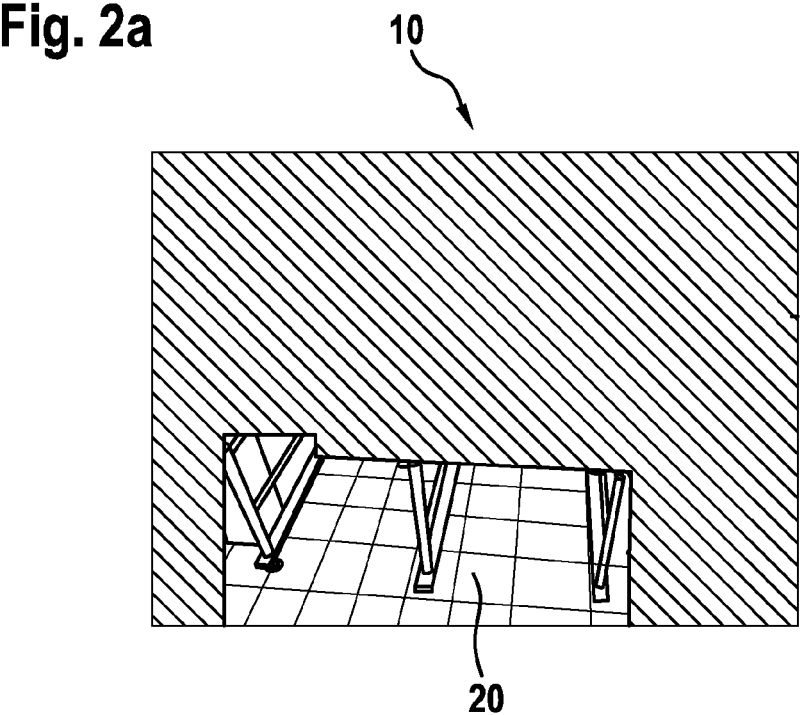
FIG. 2 shows a monitored scene comprising different sub-regions selected thereon for the content analysis for a method according to the invention in a preferred embodiment.

In FIG. 2a, the sub-region 20 extends to the region in front of the entrance or, respectively, the front region of the entrance, i.e. up to the gates, which are placed in the passage area of the entrance. Because there are no people present in the passage area when the gates are closed, a content analysis is also not necessary in this region.

Figure 2B:
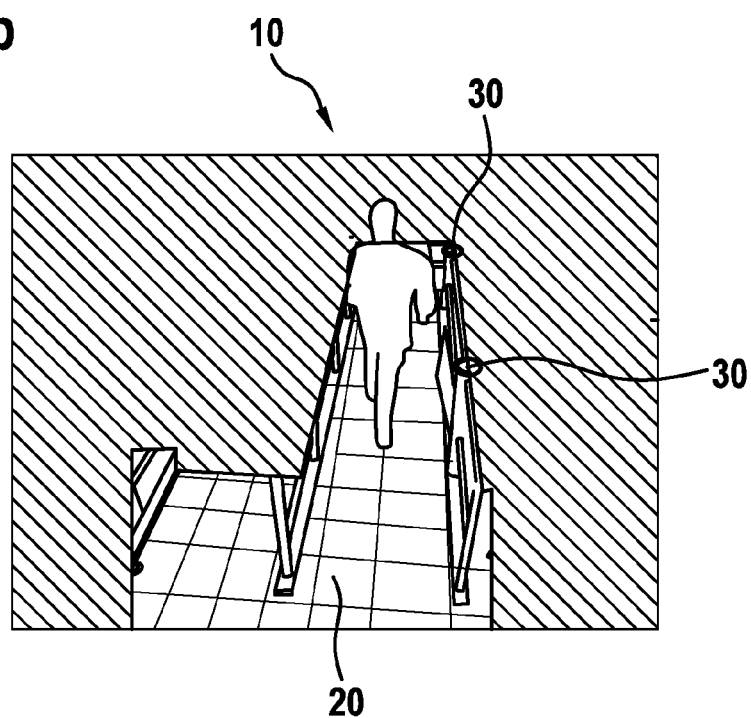

In FIG. 2b, the sub-region 20 additionally extends to the right passageway. In this case, two sensors 30 are depicted, which are configured on the gates in the passageway. The sensors can, e.g., output different values as parameters depending on whether the corresponding gate is open or closed. A gate is usually opened if a person walks up to it and wants to pass through said gate. A corresponding value of the sensors 30 is then emitted which is recorded by the camera and is used to determine respectively define the sub-region 20.

In the present case, the sub-region is expanded to include the right passageway because people are or at least may be present there. The sub-region is thus only expanded to the larger region if this is necessary on the basis of the monitoring, i.e. if people may be present there.

It can furthermore be seen that the sub-region 20 is based on a planar surface, namely the floor, of the monitored region 10. People usually move only upon said surface. The surface is preferably marked manually in the camera image, on the basis of which the sub-region to be analyzed is automatically determined by the camera or a higher-level monitoring system superior to the camera.

In FIG. 2c, the sub-region 20 is, opposed to FIG. 2a, expanded to the left passage area. In this case, two sensors 30, which are configured on the gates in the passageway, are likewise depicted. The sub-region is again only expanded by a region, in which people are located. In the present case, this relates to people who are passing through the left passageway.

The application of a method according to the invention is not exhausted merely by the monitoring of people. Other moving objects, such as, e.g., vehicles, can likewise be correspondingly monitored.

Suitable sensors for outputting values as parameters, which are used to determine the sub-region, can also be situated on other objects or articles which are suitable for defining possible monitored regions. This applies here, for example, to doors, in particular sliding doors or revolving doors, as they are, e.g., to be found at the entrance to department stores. Sensors at light barriers can also emit corresponding values.

A further option for parameters are, e.g., image processing parameters during the content analysis. In this case, inactive regions can, e.g., be identified as background and furthermore be excluded from the content analysis. It is, e.g., likewise conceivable that a detected direction of movement of an object expands the sub-region in the corresponding direction.

The invention claimed is:

1. A method for monitoring a monitored region recorded by a camera, the method comprising:
    determining, with an electronic processor, a sub-region of the monitored region based on one or more parameters;
    in response to a change in at least one of the one or more parameters, modifying the sub-region of the monitored region; and
    performing, with the electronic processor, a content analysis on images recorded by the camera, wherein the content analysis is performed for the sub-region of the monitored region and is not performed for an inactive region of the monitored region.

2. The method according to claim 1, wherein the determination of the sub-region is automatically performed when at least one of the parameters changes during monitoring.

3. The method according to claim 1, wherein the sub-region is based on a planar surface in the monitored region.

4. The method according to claim 3, wherein the sub-region is determined on the basis of the planar surface in the monitored region and height information.

5. The method according to claim 1, wherein the one or plurality of parameters comprises an output value of a sensor.

6. The method according to claim 1, wherein the one or plurality of parameters comprises at least one image processing parameter in the content analysis.

7. The method according to claim 1, wherein the sub-region comprises a continuous region or at least two regions separated from one another.

8. The method according to claim 1, wherein the content analysis for a sub-region of the monitored region, the determination of the sub-region, or both are performed in the camera or in a higher-level monitoring system when at least one of the parameters changes during the monitoring.

9. A system for monitoring a monitored region, the system comprising:

a camera installed in the monitored region and configured to record images of the monitored region, the camera including an electronic processor configured to
  determine a sub-region of the monitored region based on one or more parameters,
  in response to a change in at least one of the one or more parameters, modify the sub-region of the monitored region, and
  perform a content analysis on the images recorded by the camera, wherein the content analysis is performed for the sub-region of the monitored region and is not performed for an inactive region of the monitored region.

10. A non-transitory computer-readable medium including instructions that, when executed by an electronic processor, cause the electronic processor to perform a set of functions, the set of functions comprising:
  determine a sub-region of the monitored region based on one or more parameters;
  in response to a change in at least one of the one or more parameters, modify the sub-region of the monitored region; and
  perform a content analysis on images recorded by a camera, wherein the content analysis is performed for the sub-region of the monitored region and is not performed for an inactive region of the monitored region.

11. The method according to claim 1, wherein performing the content analysis includes at least one selected from a group consisting of performing object detection, performing object tracking, performing object classification, and checking a plausibility of an object.

12. The system according to claim 9, wherein the inactive region is masked out.

13. The system according to claim 9, wherein the monitored region includes the sub-region, the inactive region, and an irrelevant region.

14. The system according to claim 13, wherein the irrelevant region is a region of the monitored region in which no alarm or metadata are generated for.

* * * * *